United States Patent
Maunula

(10) Patent No.: US 10,322,403 B2
(45) Date of Patent: Jun. 18, 2019

(54) COATING FOR REDUCING NITROGEN OXIDES

(71) Applicant: DINEX ECOCAT OY, Vihtavuori (FI)

(72) Inventor: Teuvo Maunula, Oulu (FI)

(73) Assignee: DINEX ECOCAT OY, Vihtavuori (FI)

( * ) Notice: Subject to any disclaimer, the term of this patent is extended or adjusted under 35 U.S.C. 154(b) by 404 days.

(21) Appl. No.: 14/379,069

(22) PCT Filed: Feb. 14, 2013

(86) PCT No.: PCT/FI2013/050172
§ 371 (c)(1),
(2) Date: Aug. 15, 2014

(87) PCT Pub. No.: WO2013/121112
PCT Pub. Date: Aug. 22, 2013

(65) Prior Publication Data
US 2015/0017083 A1    Jan. 15, 2015

(30) Foreign Application Priority Data
Feb. 17, 2012   (FI) ..................................... 20125182

(51) Int. Cl.
*B01J 23/10* (2006.01)
*B01J 23/02* (2006.01)
(Continued)

(52) U.S. Cl.
CPC .......... *B01J 23/10* (2013.01); *B01D 53/8628* (2013.01); *B01D 53/9468* (2013.01);
(Continued)

(58) Field of Classification Search
CPC .............................. B01J 23/10; F01N 13/0097
See application file for complete search history.

(56) References Cited

U.S. PATENT DOCUMENTS

| | | | |
|---|---|---|---|
| 4,959,339 A | * | 9/1990 | Arai ..................... B01D 53/945 502/302 |
| 5,342,599 A | | 8/1994 | Slone |

(Continued)

FOREIGN PATENT DOCUMENTS

| CN | 1060613 | 4/1992 |
|---|---|---|
| DE | 19619791 | 11/1996 |

(Continued)

OTHER PUBLICATIONS

CN Office Action, dated Nov. 23, 2015; Application No. 201380020247.3, with partial English translation.
(Continued)

*Primary Examiner* — Aileen B Felton
(74) *Attorney, Agent, or Firm* — Berggren LLP

(57) ABSTRACT

A catalyst coating for use in a hydrolysis catalyst (H-catalyst) for the reduction of nitrogen oxides, a manufacturing method for such a coating, a catalyst structure and its use are described. The H-catalyst includes alkaline compounds, which are capable of adsorbing HNCO and/or nitrogen oxides and which include alkali and alkaline earth metals, lanthanum and/or yttrium and/or hafnium and/or prasedium and/or gallium, and/or zirconium for promoting reduction, such as for promoting the hydrolysis of urea and the formation of ammonia and/or the selective reduction of nitrogen oxides.

4 Claims, 9 Drawing Sheets

Catalyst coatings of the invention for promoting a hydrolysis and SCR reaction in a variety of arrangements:
3 = Cell structure (mixer structure) as well as coatings, 4 = Thin, low surface area hydrolysis catalyst, 5 = Hydrolysis catalyst, which contains alkaline compounds, 6 = SCR-catalyst

(51) Int. Cl.
| | |
|---|---|
| B01D 53/94 | (2006.01) |
| F01N 3/20 | (2006.01) |
| F01N 3/28 | (2006.01) |
| B01J 37/02 | (2006.01) |
| B01J 35/00 | (2006.01) |
| B01J 23/00 | (2006.01) |
| B01J 23/30 | (2006.01) |
| B01J 27/053 | (2006.01) |
| B01J 29/06 | (2006.01) |
| B01J 29/08 | (2006.01) |
| B01J 29/12 | (2006.01) |
| B01J 29/14 | (2006.01) |
| B01J 29/16 | (2006.01) |
| B01J 29/40 | (2006.01) |
| B01J 29/44 | (2006.01) |
| B01J 29/46 | (2006.01) |
| B01J 29/48 | (2006.01) |
| B01J 29/65 | (2006.01) |
| B01J 29/67 | (2006.01) |
| B01J 29/68 | (2006.01) |
| B01J 29/69 | (2006.01) |
| B01J 29/70 | (2006.01) |
| B01J 29/74 | (2006.01) |
| B01J 29/76 | (2006.01) |
| B01J 29/78 | (2006.01) |
| B01J 35/02 | (2006.01) |
| B01J 35/04 | (2006.01) |
| F01N 3/10 | (2006.01) |
| F01N 13/00 | (2010.01) |
| B01D 53/86 | (2006.01) |
| B01J 27/24 | (2006.01) |

(52) U.S. Cl.
CPC ............ *B01J 23/002* (2013.01); *B01J 23/02* (2013.01); *B01J 23/30* (2013.01); *B01J 27/053* (2013.01); *B01J 27/24* (2013.01); *B01J 29/061* (2013.01); *B01J 29/088* (2013.01); *B01J 29/126* (2013.01); *B01J 29/146* (2013.01); *B01J 29/166* (2013.01); *B01J 29/405* (2013.01); *B01J 29/44* (2013.01); *B01J 29/46* (2013.01); *B01J 29/48* (2013.01); *B01J 29/655* (2013.01); *B01J 29/67* (2013.01); *B01J 29/68* (2013.01); *B01J 29/69* (2013.01); *B01J 29/7057* (2013.01); *B01J 29/7415* (2013.01); *B01J 29/7615* (2013.01); *B01J 29/7815* (2013.01); *B01J 35/0006* (2013.01); *B01J 35/0026* (2013.01); *B01J 35/023* (2013.01); *B01J 35/04* (2013.01); *B01J 37/0215* (2013.01); *B01J 37/0246* (2013.01); *F01N 3/106* (2013.01); *F01N 3/2066* (2013.01); *F01N 3/2892* (2013.01); *F01N 13/0097* (2014.06); *B01D 53/9418* (2013.01); *B01D 2255/209* (2013.01); *B01D 2255/2022* (2013.01); *B01D 2255/2027* (2013.01); *B01D 2255/2042* (2013.01); *B01D 2255/2045* (2013.01); *B01D 2255/2061* (2013.01); *B01D 2255/2063* (2013.01); *B01D 2255/20707* (2013.01); *B01D 2255/20715* (2013.01); *B01D 2255/30* (2013.01); *B01D 2255/502* (2013.01); *B01D 2255/504* (2013.01); *B01D 2255/9025* (2013.01); *B01J 2229/42* (2013.01); *B01J 2523/00* (2013.01); *F01N 2240/20* (2013.01); *F01N 2510/0684* (2013.01); *F01N 2610/02* (2013.01); *Y02T 10/24* (2013.01)

(56) References Cited

U.S. PATENT DOCUMENTS

| | | | |
|---|---|---|---|
| 5,693,300 | A | 12/1997 | Slone |
| 5,821,190 | A | 10/1998 | Kurabayashi et al. |
| 6,713,031 | B2 | 3/2004 | Harris et al. |
| 8,607,551 | B2 | 12/2013 | Nagaoka et al. |
| 2002/0025905 | A1* | 2/2002 | Harris ............... B01D 53/9431 502/309 |
| 2006/0233689 | A1 | 10/2006 | Hirata et al. |
| 2008/0034740 | A1 | 2/2008 | Strehlau et al. |
| 2011/0047990 | A1 | 3/2011 | Nagaoka et al. |

FOREIGN PATENT DOCUMENTS

| | | |
|---|---|---|
| DE | 19734627 | 1/1999 |
| EP | 0487886 | 6/1992 |
| EP | 0498325 | 8/1992 |
| EP | 0555746 | 8/1993 |
| EP | 0615777 | 9/1994 |
| EP | 0834348 | 10/1997 |
| EP | 0896831 | 2/1999 |
| EP | 0935055 | 2/1999 |
| EP | 1153648 | 11/2001 |
| EP | 1676986 | 7/2006 |
| EP | 2095866 | 2/2009 |
| EP | 2290204 | 3/2011 |
| FR | 2940921 | 7/2010 |
| WO | 92/04966 | 4/1992 |
| WO | 2004-022211 | 3/2004 |
| WO | 2009-148024 | 12/2009 |

OTHER PUBLICATIONS

International Search Report dated Jun. 11, 2013, corresponding to PCT/FI2013/050172.
Piazzesi, et al.; Adsorption and Hydrolysis of Isocyanic Acid on TiO2. Applied Catalysis B: Environmental 65 (2006), pp. 55-61.
Extended European search report, dated Sep. 15, 2015; Application No. 13748714.6.

* cited by examiner

Catalyst coatings of the invention for promoting a hydrolysis and SCR reaction in a variety of arrangements:
3 = Cell structure (mixer structure) as well as coatings, 4 = Thin, low surface area hydrolysis catalyst, 5 = Hydrolysis catalyst, which contains alkaline compounds, 6 = SCR-catalyst.

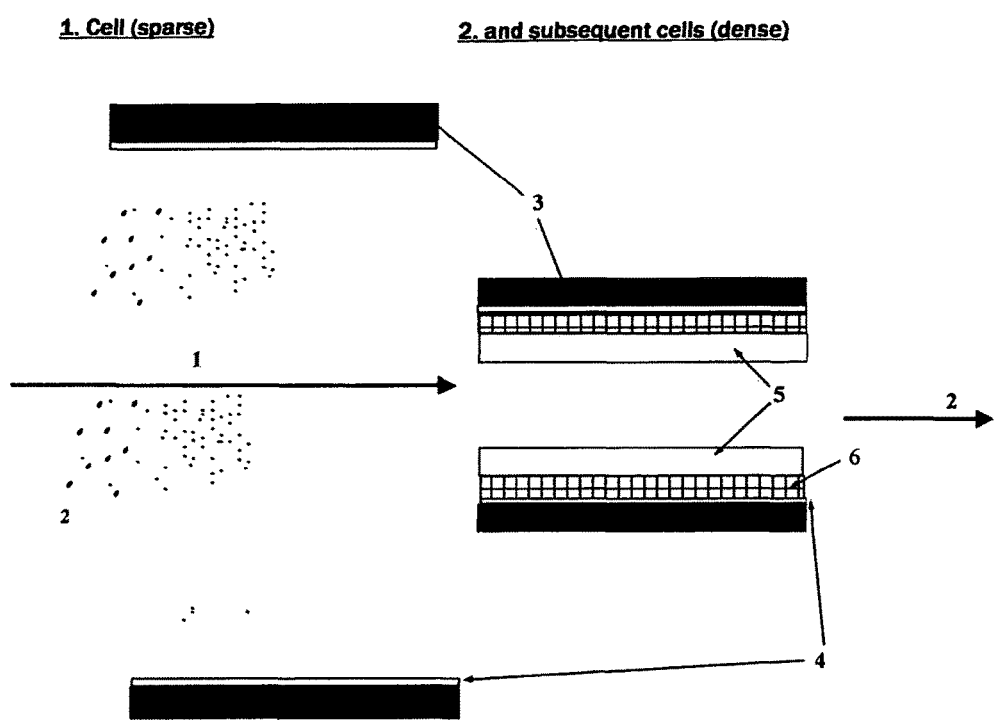

Fig. 2

Catalyst coatings of the invention in channels of unequal sizes present in two successive cells (mixer structure) - section view of one channel. 1 = Incoming fluid, 2 = Outgoing (treated) fluid, 3 = Cell structure (mixer structure), 4 = Thin low surface area hydrolysis catalyst coating, 5 = Hydrolysis catalyst coating, which contains alkaline compounds, 6 = SCR-catalyst coating.

Fig. 3A, 3B, 3C Mixer structures made from diagonally crimped foil (A, B and C)

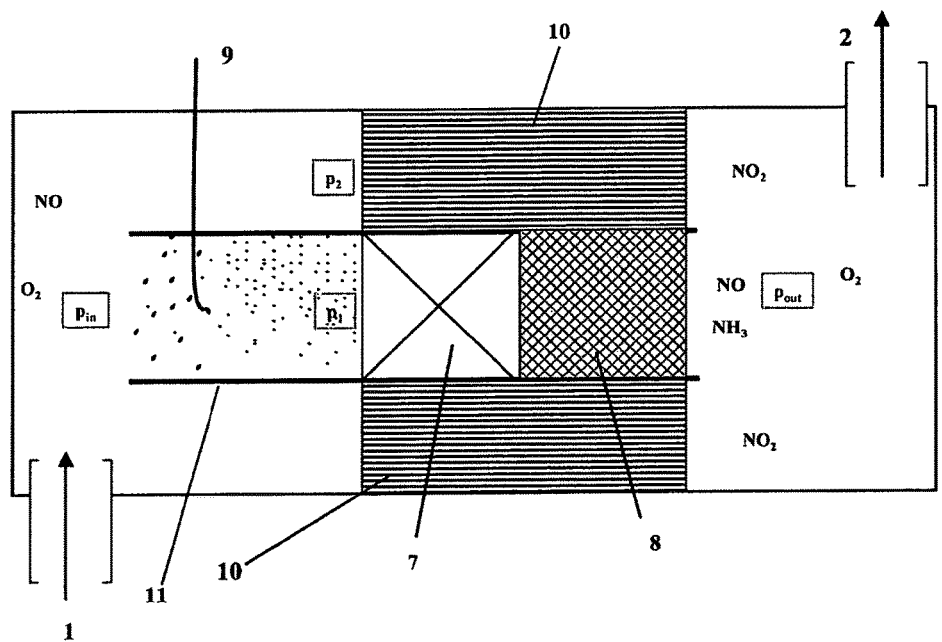

Fig.4

Cross-section of a parallel system, having oxidation catalyst + H-catalyst in an effort to adjust flow distributions, to minimize pressure drop, as well as to optimize catalyst reactions. This may comprise parallel cells or a cell surrounded by a ring type oxidation catalyst cell. 10 = oxidation catalyst, 11 = pipe for a hydrolysis unit and for the introduction of a reducer. Flow can also be regulated solely by means of cells and pipe sizes in a system that has no oxidation catalyst.

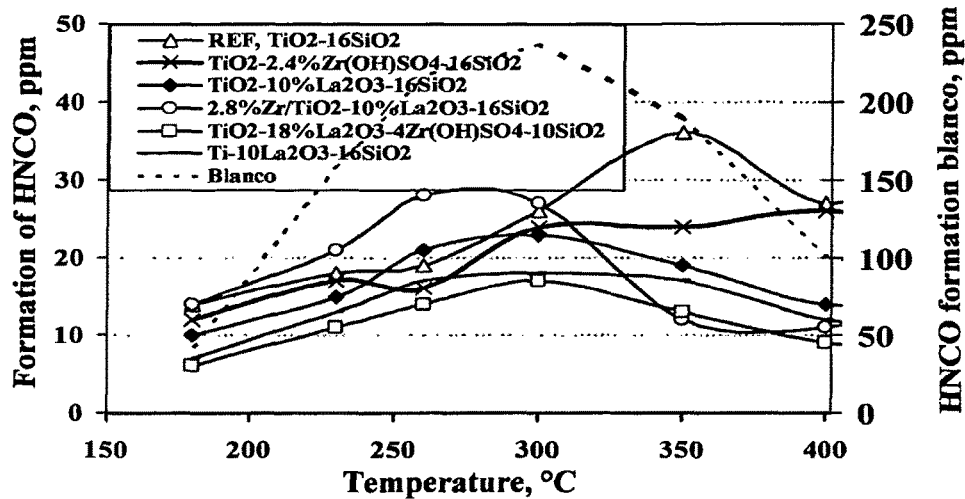
Fig. 5. HNCO concentration after H-catalyst - test series 1.
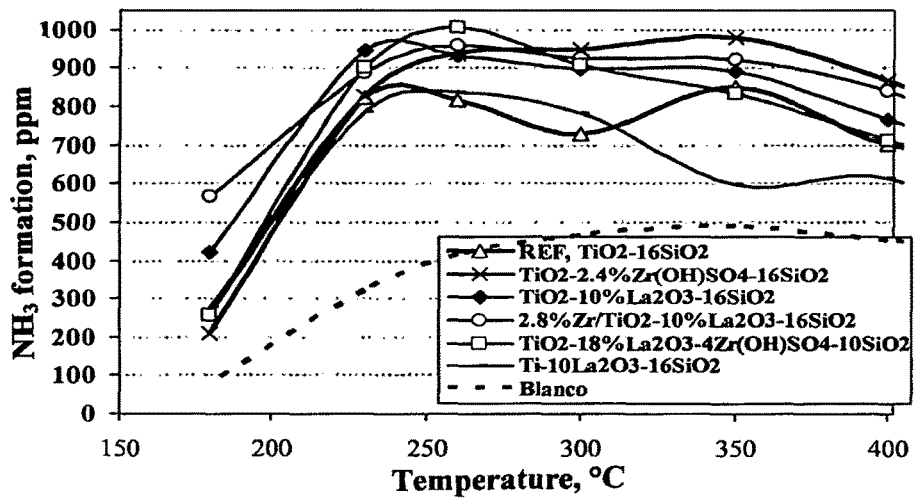
Fig. 6 NH₃ concentration after H-catalyst - test series 1.

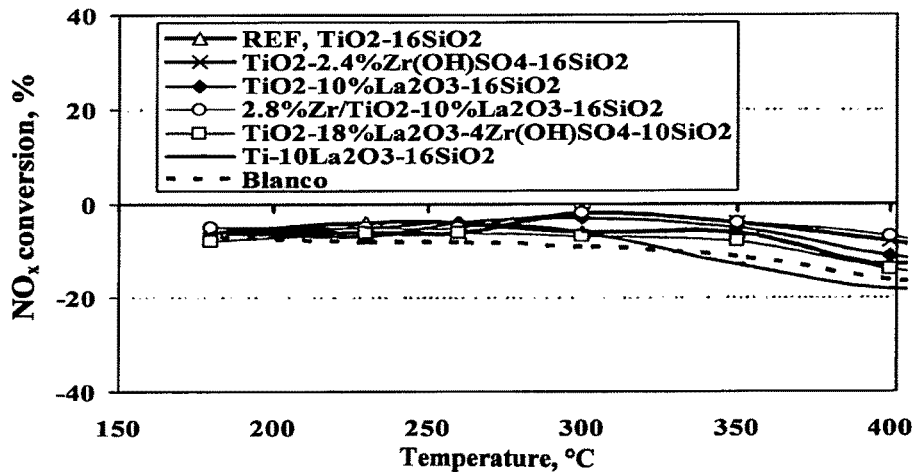
Fig. 7 $NO_x$ conversion in H-catalyst - test series 1. Negative conversion relating to the oxidation of $NH_3$, which must be minimized.
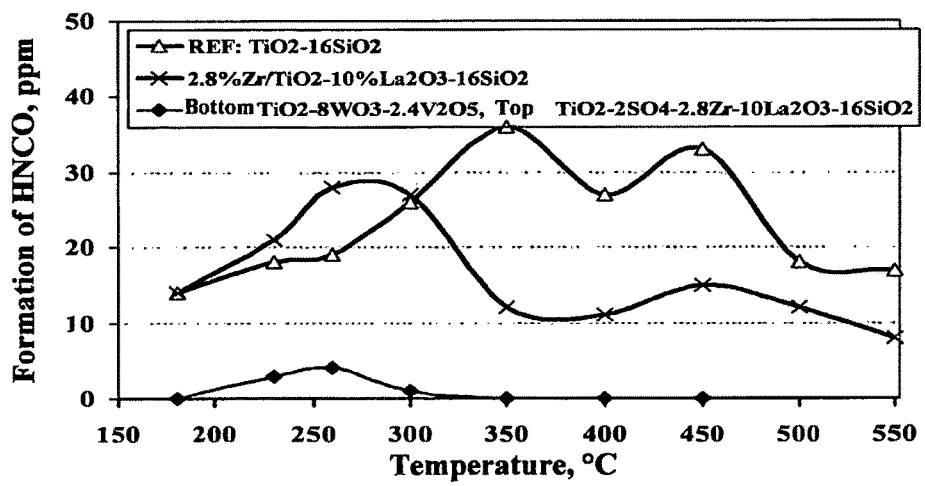
Fig. 8 HNCO concentration after H-catalyst. The effect of a 2-layer catalyst - test series 1.

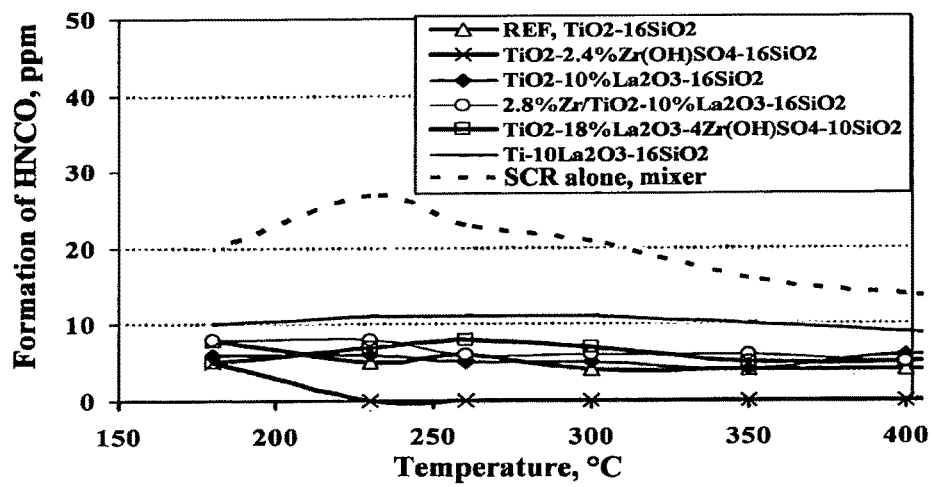
Fig. 9 HNCO concentrations after combination H-cat + SCR-cat.
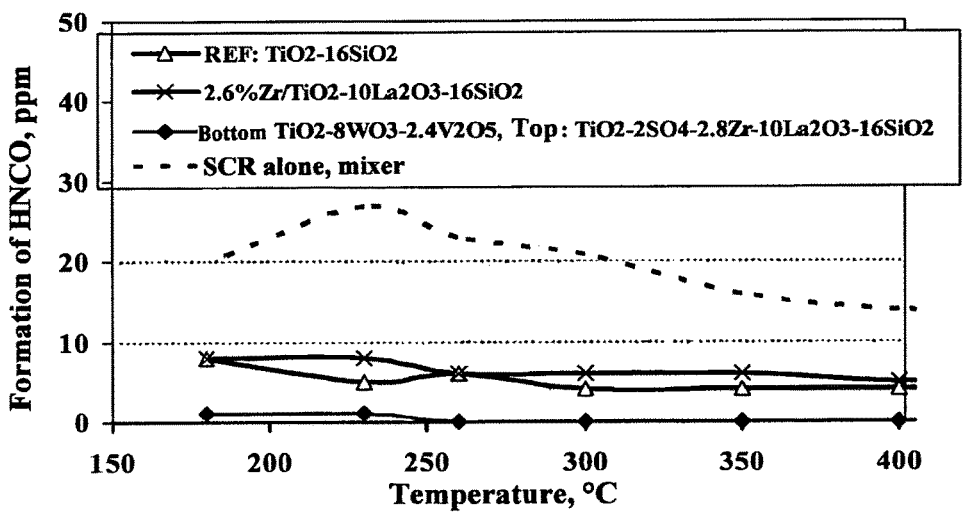
Fig. 10 HNCO concentrations after combination H-cat + SCR-cat. The effect of a 2-layer catalyst.

H-catalyst and reducer injection in an oxidation catalyst bypass. 7 = sparse mixer structure (crimping equivalent to ≤ 100 cpsi), 8 = dense mixer structure (crimping equivalent to >100 cpsi), 9 = reducer introduction (urea or the like), 10 = oxidation catalyst, 12 = coated or uncoated cell structure for flow distribution adjustment and for oxidation, 13 = SCR

COATING FOR REDUCING NITROGEN OXIDES

FIELD OF THE INVENTION

This invention relates to a catalyst coating for use in a hydrolysis catalyst (H-catalyst) for reducing oxides of nitrogen. The invention relates also to a manufacturing method for such a coating, as well as to a catalyst structure and its use.

BACKGROUND OF THE INVENTION

The combustion of fuel in an excess oxygen-comprising gas mixture is an efficient way of producing energy in stationary and mobile applications. Fuel efficient diesel engines are used almost exclusively in trucks and increasingly in cars, especially in Europe. In lean mixture combustion, the emissions usually have quite a low content of carbon monoxide (CO) or hydrocarbons (HC), but, regarding oxides of nitrogen ($NO_x$) and particles (particulate matter, PM), problems may arise in reaching the emission standards imposed by authorities. Moreover, carbon monoxide and hydrocarbon emissions can be eliminated effectively, with an oxidation catalyst, but the reduction of nitrogen oxides and particles requires the use of other types of after-treatment methods. Particles can be removed effectively with various particulate filters. The reduction of nitrogen oxides from an excess oxygen-comprising waste gas is difficult, because possible reducing agents tend to oxidize instead of reacting with nitrogen oxides.

The reduction of nitrogen oxides in incineration facilities became a topical issue in the early 1970s in Japan where $NO_x$ emission restrictions were imposed for cutting down smog that causes problems particularly in large cities. The selective catalytic reduction (SCR) of nitrogen oxides with ammonia ($NH_3$) was developed for these objectives. In the catalyst, ammonia reacts primarily with $NO_x$ despite the presence of excess oxygen. As a matter of fact, oxygen promotes the reaction in SCR-catalysts, which, since that time, have been $TiO_2$-based in commercial products, comprising vanadium, tungsten and molybdenum oxides as active components and stabilizers. There are also numerous publications about other types of SCR-catalysts, which are oxide-, zeolite- or carbon-based or mixtures thereof. SCR-catalysts are nowadays nearly always honeycomb type, whereby the pressure drop and clogging remain modest. The catalysts can be extruded from SCR-catalyst mass or coated on the surface of a honeycomb type carrier material. The carrier material is generally ceramic or metallic.

The main reaction of SCR in an excess oxygen-comprising mixture can be presented as follows:

$$4NH_3 + 4NO + O_2 \longrightarrow 4N_2 + 6H_2O \qquad (1)$$

Ammonia can be introduced by way of purpose-built injection nozzles as a gas or an aqueous solution into a waste gas slightly in front of the catalyst. When ammonia is used as a reducing agent, the ammonia is immediately in its correct makeup, and the restricting factor can be mixing within the gas flow or vaporization of the aqueous solution.

It was discovered in the 1980s that ammonia can be replaced by using also other reducing agents, such as urea or cyanuric acid, with a content of ammonia derivatives or nitrogen. The SCR systems designed for automobiles have been principally based from the beginning on the use of urea as a reducing agent, since the use, storage and transport of urea and urea solution is safe as compared to ammonia. Urea ($CO(NH_2)_2$) comprises two $NH_2$ groups and the disintegration of one urea molecule produces two molecules of ammonia in a water-comprising gas mixture. Pure urea is a solid white substance readily soluble in water in high concentrations. In urea-SCR systems for truck and power plant applications, the employed reducing agent is indeed a urea-water-solution:

$$(NH_2)_2CO \rightarrow NH_3 + HNCO \qquad (2) \text{ thermolysis}$$

$$HNCO + H_2O \rightarrow NH_3 + CO_2 \qquad (3) \text{ hydrolysis}$$

Urea is carried as a 32.5 percent solution in truck applications, and the solution is introduced into the exhaust gas along with air or alone as a solution. The use of air with the solution provides a mixture that can be delivered under pressure into the hot exhaust gas. When the employed reducing agent is a urea solution, it is necessary to leave a sufficient amount of time for the urea solution to become mixed in the pipe for vaporization, as well as for the thermolysis (reaction 2) and hydrolysis (reaction 3) of urea. The urea solution must be injected to a sufficient distance from the forward edge of an SCR catalytic converter for the urea to have been reacted into ammonia consistently in radial direction. In truck applications (engine displacement 4-20 liters), the amounts of exhaust gas are so large that there is generally needed a circular cell 250-400 mm in diameter for maintaining the linear speeds and pressure drop within a regulatory range and for enabling the SCR-catalyst to function without upsetting the engine operation. Therefore, the mixing of urea in radial direction is important. The thermally occurring thermolysis and hydrolysis require a sufficient amount of time, which is why the urea introduction point may be as far as a few meters away from a forward edge of the SCR-catalyst.

Trucks may also involve the use of a diesel oxidation catalyst to promote the oxidation of hydrocarbons, carbon monoxide and NO into $NO_2$. Oxidation catalysts normally employ highly sulfur-resistant platinum (Pt) as an active metal. In view of heat utilization, it is desirable to install the catalysts as close to the engine as possible. The oxidation catalyst is beneficial for the operation of an SCR-catalyst, because the removal of HC and the resulting $NO_2$ provide a remarkable promotion of SCR reactions. It has been proposed that a special hydrolysis catalyst (H-catalyst) be used in front of the SCR-catalyst to promote the mixing of urea and the hydrolysis at various temperatures (Döring and Jacob, 21$^{st}$ Vienna Motor Symposium 2000). At the same time, it was proposed that the hydrolysis catalyst and the pre-oxidation catalyst be fitted side by side, whereby urea is only introduced into a side flow of exhaust gas. Hence, it is possible that the automobile having an SCR system can be fitted with a pre-oxidation catalyst, a hydrolysis catalyst, an SCR-catalyst, and a re-oxidation catalyst, the purpose of the latter being to remove the possible ammonia left in the exhaust gas after the SCR reaction (EP0896831). The mixer type assembly has also been referred to as a vaporizer with a catalytic coating on its surface. Another argument mentioned for the use of an H-catalyst is that the SCR-catalyst volume can be reduced e.g. by 10-30% (EP0555746).

The use of a hydrolysis catalyst has been proposed either alone or in combination downstream of a separate vaporizer element (EP 0487886). Mentioned as catalyst coatings are $TiO_2$, Al-oxide, $SiO_2$ or a mixture thereof, which may also be accompanied by $SO_3$ or $WO_3$, i.a. for acidic properties or thermal stabilization. The specific surface area has been said to exceed 10 m$^2$/g (EP 0487886). It has also been mentioned that, in addition to these, the hydrolysis catalyst comprises zeolite (H-mordenite, H-ZSM5) (EP 0555746). The H-catalyst must have a resulting ammonia decomposition activity as slight as possible (EP 0487886), as otherwise extra loss is generated in urea consumption.

The hydrolysis of urea and its mixing with a gas flow can be promoted by improving the actual injection of urea, which can be assisted by using various nozzles, supply pressure adjustment and control engineering. An aspect of major importance is how far and at which point in the apparatus the injection of urea is conducted. The aspect that must be considered in terms of dimensions is to design the urea spray and flow channel in such a shape that there is no spraying of urea onto cold walls. Should urea end up as a droplet on a wall, or on a cold wall at that, there is a hazard of generating undesirable by-products, thus increasing the loss of urea. In SCR, the operational efficiency of urea in the reduction of nitrogen oxides must be more than 90%, because, in a standard European test cycle, the consumption of urea amounts for example to 3-6% of the consumption of diesel fuel, thus representing a major expense.

A proposal has also been made for the introduction of solid urea as a powder, thus avoiding the need to carry water along with a solution. The system may also include a hydrolysis catalyst just like in the introduction of a liquid urea solution (EP 0615777). A predicament in these systems is often the consistent dosage of powder into exhaust gas in various conditions.

Problems in the described hydrolysis catalysts may include the fact that, with a single H-catalyst, it is very difficult to achieve simultaneously an effective low temperature hydrolysis, mixing, and slight decomposition of $NH_3$ into nitrogen or oxides of nitrogen over the entire required temperature range (100-600° C.). The composition and dimensional design of an H-catalyst, which is effective in hydrolysis at 150-200° C., is often too active at high temperatures and $NH_3$ decomposes prior to the SCR reaction. The hydrolysis catalysts have been described to be high temperature catalysts with a large surface area (10 $m^2$/g) and plenty of porosity, and particularly small pores. It has also been described that the H-catalyst has specifically involved the use of compounds that provide surface acidity for the adsorption of $NH_3$. In this case, the dwell time for ammonia becomes nevertheless longer as a result of adsorption, pores, and volume, and is the longest at low temperatures, whereby kinetically $NH_3$ has more chances to decompose and stay for too long in the H-catalyst. The H-catalysts have been described to be mixer structures, wherein the mixing has been described to primarily occur within a single channel of the cell and the aperture numbers have been about 150 cpsi (cells per $in^2$) and the amount of coating to be reasonably high, i.e. about 150-200 g/L (EP 0896831). Some mixing inside a cell channel is achieved with various flow barriers and claws, but mixing in the reactor's radial direction remains insignificant, whereby the inconsistency in the radial direction of flow and particularly in temperature may even be accentuated. Such structures resemble catalyst honeycomb cells, which, when compared to an empty exhaust pipe, have a large geometric surface area (GSA) and amount of catalyst, a low Reynolds number (→mass transfer efficiency) in channels, weak mixing in radial direction. Such structures are good in terms of promoting a catalytic reaction, but the urea and the solution must vaporize and become mixed within the gas flow before any advantage is obtained by the catalytic promotion of hydrolysis. What is desired at the same time is nevertheless good mixing and urea injection as close as possible to the SCR-catalyst or the H-catalyst's face surface. If the H-catalyst has an excessively high aperture number, there is a hazard of the urea-water spray striking the face surface of a dense cell with negative consequences similar to those resulting from the spray hitting the walls of a pipe. A further hazard in such a case is that the H-catalyst cell's frontal surface and the coating thereon are worn down mechanically by droplets or the dense cell is clogged by solid by-products. A common problem regarding separate hydrolysis and SCR reactors is how to convert urea completely into ammonia, how to convey the resulting $NH_3$ into an SCR reactor for reducing nitrogen oxides with ammonia.

If the hydrolysis catalyst is installed in such a way that just part of the flow passes therethrough, it will be difficult to regulate the flow rate through the hydrolysis catalyst with a suitably sparse or dense cell so as to provide at the same time an appropriate space for the urea spray in front of the cell and to set the linear speed within a suitable range. The back pressure of a sparse cell is lower and too much flow passes through the cell. In the case of a dense cell, the back pressure is too high with the flow rate remaining low, nor can urea be injected at a site too close to the forward edge of the cell. For these reasons, the hydrolysis reactor needed further development.

Another proposal has been made for 3D mixer structures, which have been used in an uncoated condition or have been coated with a typical SCR-catalyst (static mixers). In that case, the mixing is most effective with large channel sizes, which is good for power plant applications involving large amounts of particles. Thus, the mass transfer and the distribution of urea/ammonia are consistent, yet there are problems, including e.g. a small amount of catalyst material on the walls of traditional, large-channeled static mixers, and the hydrolysis of urea is based on reactions which occur thermally or in an SCR-catalyst.

BRIEF DESCRIPTION OF THE DRAWINGS

FIG. 2 shows catalyst coatings of the invention in channels of unequal sizes in two successive cells (mixer structure), section view of one channel: 1 illustrates incoming fluid, 2 illustrates outgoing treated fluid, 3 illustrates cell structure, mixer structure, 4 illustrates thin low surface area hydrolysis catalyst coating, 5 illustrates catalyst coating, which contains alkaline compounds, and 6 illustrates SCR catalyst.

FIG. 4 shows cross section of a parallel system, having oxidation catalyst plus H catalyst in an effort to adjust flow distributions, to minimize pressure drops, as well as to optimize catalyst reactions. This may comprise parallel cells or a cell surrounded by a ring type oxidation catalyst cell. 10 illustrates oxidation catalyst, 11 illustrates pipe for a hydrolysis unit and for the introduction of a reducer. Flow can also be regulated solely by means of cells and pipe sizes in a system that has no oxidation catalyst.

FIG. 5 shows HNCO concentration after H catalyst test series 1.

FIG. 6 shows $NH_3$ concentration after H catalyst test series 1.

FIG. 7 shows $NO_3$ conversion in H catalyst test series 1. Negative conversion relating to the oxidation of NH3 which must be minimized.

FIG. 8 shows HNCO concentration after H catalyst. The effect of a 2 layer catalyst test series 1.

FIG. 9 shows HNCO concentrations after a combination of H catalyst plus SCR catalyst.

FIG. 10 shows HNCO concentrations after a combination of H catalyst plus SCR catalyst. The effect of a 2 layer catalyst.

DESCRIPTION OF THE INVENTION

Figure 1:
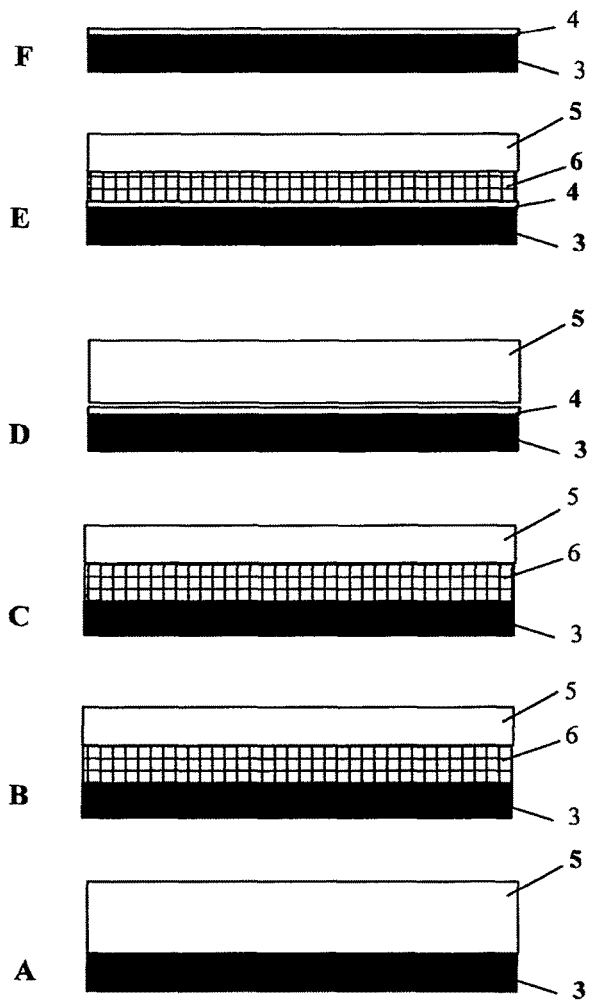
FIG. 1 shows catalyst coatings of the invention for promoting a hydrolysis and SCR reaction in a variety of arrangements: 3 illustrates cell structure (mixer structure), as well as coatings, 4 illustrates thin, low surface area hydrolysis catalyst, 5 illustrates hydrolysis catalyst, which contains alkaline compounds, and 6 illustrates SCR catalyst.

An object of this invention is to provide for exhaust or effluent gas applications a high performance catalyst coating for use in a hydrolysis catalyst and in a hydrolysis catalyst unit, which has a working range as extensive as possible and which may also have some $NO_x$ reduction capability. Another object of the invention is a manufacturing method for such a coating, as well as a catalyst structure and its use.

With regard to composition, the basic inventive concept is that the hydrolysis catalyst (H-catalyst), which has been installed downstream of the point of introducing a reducing agent used in the reduction of urea or other nitrogen oxides, comprises alkaline compounds adsorbing HNCO and/or adsorbing nitrogen oxides, such as alkali and alkaline earth metals, lanthanum and/or yttrium and/or hafnium and/or prasedium and/or gallium, and/or zirconium for promoting reduction, such as for promoting the hydrolysis of urea and formation of ammonia and/or the selective reduction of nitrogen oxides.

Preferably, the unit comprises elements, which agitate the flow three-dimensionally and the surface of which is provided with said coating composition, and the channel patterns and coating composition of such elements can also change in the direction of flow. The hydrolysis catalyst of the invention enables to shorten a distance (diminish a pipe volume) from the reducing agent injection point to the SCR-catalyst by virtue of enhanced mixing and thermal and catalytic hydrolysis. In addition, the SCR-catalyst, which possibly comprises an H-catalyst, provides a possibility of commencing the reduction of $NH_x$ as soon as $NH_3$ is formed in reaction. Advantage is particularly gained at low temperatures (150-300° C.), and using elements of the invention enables a smaller volume in a downstream located SCR-catalyst.

The fields of use for the invention include exhaust, flue and effluent gas applications in mobile or stationary operations at normal, positive or negative pressure. Pressures higher than normal exist for example in pressurized boiler furnaces, as well as in engines upstream of a turbocharger. Combustion, which generates oxides of nitrogen, has allowed the use of any gaseous (for example methane, propane, biogas), liquid (heavy or light fuel oil, diesel, gasoline, biofuels) or solid fuel (coal, biofuels) or mixtures thereof. On average, application conditions are lean (excess oxygen), but there are useful functions, which involve enrichments for example because of the regeneration of a particulate filter or an $NO_x$ adsorber. Enrichments (deficiency or stoichiometric ratio of oxygen) can also be utilized for the removal of sulfates and nitrates from an H-catalyst unless those are otherwise desorbed.

Typically, the reducing agent for nitrogen oxides is urea or some other odd nitrogen-comprising solid, liquid or gaseous reducer as such, as a solution, or as a mixture of several reducers. In addition to urea, such reducing agents may comprise cyanuric acid, hydrazine, various ammonium compounds, various amine compounds, various nitrogen-comprising organic or inorganic compounds (e.g. pyridine). The catalyst according to the invention can be used not only for urea but also for these other sources of ammonia.

In the invention, the hydrolysis catalyst composition has been upgraded with respect to the prior art so as to obtain a more effective reaction into $NH_3$ and less side reaction, as well as to provide the hydrolysis unit with some SCR capability integrated therein. The prior known hydrolysis catalysts have been $TiO_2$-based, comprising Si, Al, zeolite, and W as additives. An objective in the prior known techniques has been to provide an acidic catalyst surface capable of generating as much $NH_3$ as possible without a side reaction. The acidic surface nevertheless adsorbs ammonia, which may remain thereon for an unnecessarily long time, especially at low temperatures. The invention makes use of properties opposite to those of the prior art. It is an objective to establish alkaline sites on the catalyst surface by supplementing the catalyst for example with lanthanum (La), yttrium (Y), alkaline earth metals and/or alkali metals. The alkaline sites develop a powerful adsorption for acidic compounds, such as HNCO, the discharging amount of which is as little as possible, particularly at low temperatures when the adsorption is strong and the formation of HNCO as a by-product is at its peak. At the same time, the adsorption amounts of ammonia on the alkaline surface diminish significantly. The adsorption of HNCO at low temperatures (>180-250° C.) postpones the hydrolysis reaction of HNCO to take place in a condition with the catalyst slightly more warmed up. The same chemical compounds also function as adsorbents for nitrogen oxides, which capability can also be utilized in certain conditions. In addition, compounds of Zr, among other things, may also be present. The exemplified support substances were $TiO_2$-based, but it is also possible to employ other porous carriers (zeolites, silica, aluminas) for a similar purpose jointly with alkaline additives and adsorbents.

The coating according to the invention can also be used for coating one or more cells in a honeycomb system, and some of the other cells can be provided with an acidic and less alkaline coating. The acidic layer can also be SCR-active. A high $NH_3$ adsorption capability promotes the SCR reaction, increasing the adsorption of an $NH_3$ reactant. Acidity correlates e.g. with $NH_3$ adsorption strengths in H-catalysts. It is desirable to have HNCO react rapidly into $NH_3$, but $NH_3$ must not decompose. Alkaline $NH_3$ adsorbs vigorously to acidic surfaces, which may promote a catalyst reaction or cause inhibition at low temperatures. In superimposed layers, one can be provided with an acidic and the other with an alkaline or less acidic coating. Acidity at a specific temperature can be assessed e.g. with $NH_3$ or pyridine adsorption measurements. Total alkalinity can be assessed e.g. with $CO_2$ adsorption measurements. Alkalinity correlates also to the adsorption capacity or strength of nitrates. Acidities can be regulated i.a. with sulfate amounts, which sulfate can be stabilized with Zr, Sn or other corresponding sulfate-producing cations (sulfated Zr oxide). Alkalinity has been increased in the examples i.a. with La, Ca, Ba, Sr and Y. In successive cells, the above-described practices can be applied to the latter cell for increasing, especially in the SCR-catalyst layer, the high temperature $NH_3$ adsorption capacity, whereby the urea-generated $NH_3$ reacts with $NO_x$ rather than with oxygen.

FIG. 1 shows an example of catalysts according to the invention with a variety of coatings. Version A has a coating (5) with a content of alkaline compounds on the surface of a cell structure (3), which composition promotes the adsorption and reactions of HNCO and $NO_x$. By supplementing the same structure with a bottom or top SCR-catalyst layer (6), there is obtained an immediate SCR reaction by means of developing $NH_3$ (FIG. 1, versions B and C). If the SCR-catalyst (6) is a bottom layer, the urea or HNCO comes in the flow direction first upon the hydrolysis catalyst (5), wherefrom the resulting $NH_3$ passes easily into the bottom layer for an SCR reaction. Since the alkaline H-catalyst binds less $NH_3$ than prior known H-catalysts, the hindering effect of $NH_3$ adsorption is lesser on the passage of $NH_3$ into the SCR layer or unit. The adsorption of nitrogen oxides can also be utilized when H- and SCR-catalysts are integrated. In that case the adsorbed $NO_x$ is able to react with $NH_3$ at the adjacent SCR-catalyst site. If the SCR layer (6) is on top, the thermally generated $NH_3$ may react at once in the top layer as the decomposition/oxidation of $NH_3$ is slight, and the unreacted HNCO and $NO_x$ may migrate, adsorb and react in the bottom layer. In addition, the structure may include a low surface area coating (4), the function of which is to serve as a bond/shield layer between the cell structure and other catalyst layers (versions D and E). This layer (4) may also include alkaline compounds. This coating can also be used by itself as a shield layer for honeycomb or pipe structures, e.g. near the urea injection point, and in applications wherein the geometric surface area for a catalyst is low and the channel sizes are large (version F). The alkaline catalyst surface binds the acidic HNCO and its derivatives its surface, precluding adverse polymerization reactions also in this low surface area coating. Hence, the main objective of this structure is to encourage mass transfer and mixing. Since the amount, surface area and dwell time of a catalyst are low, neither can the drawbacks of a high temperature (decomposition/oxidation of $NH_3$) be accentuated. This structure is particularly suitable for a first sparse cell structure in honeycombs, wherein the principal objective is to ensure mixing. The urea solution may also be in liquid state as the flow strikes the catalyst surface in the event that vaporization is still ongoing, e.g. because of a large droplet size of the solution, a very low operating temperature or incorrect injection.

The porous carrier employed for an H-catalyst can be e.g. $TiO_2$, $TiO_2$—$SiO_2$, zeolite or a mixture thereof. In zeolites, the $Si/Al_2$ ratio is typically in excess of 10, which makes the same durable wherever employed. Thus, the starting base layers are moderately acidic, which gives the same a good $NH_3$ adsorption capability. Alkaline additives can be used for decreasing this acidity and for respectively increasing alkalinity, thus promoting the adsorption of HNCO, nitrogen oxides, and sulfur oxides. Although accumulating on a catalyst, the sulfur oxides do not totally eliminate the catalyst's alkalinity, and the use of sulfated compounds has enabled an intentional stabilization of these cations. This was found to provide a hydrolysis promoting effect, and the results with sulfurized H-catalysts were also good. The SCR-catalyst layer can be in the form of a segregated or integrated layer, whereby these alkaline compounds can also be used in the SCR layer. The amount of alkaline additives in the H-catalyst is within the range of 0.1-80 wt %, typically within the range of 0.5-20 wt %. The amount depends on a cation and desired properties, and on the molecular weight as well as coatability of an element. In light alkali metals, a reasonably high amount of mass is obtained even at low weight fractions. With larger amounts (>10%), the catalyst is provided with a significant adsorption capability for nitrogen oxides, which can be utilized in reaction chains. In addition to said alkaline compounds, the H-catalyst may involve the use of compounds of zirconium, which are in the form of oxides and sulfated hydroxides, the Zr compounds being acidic or alkaline. Pure $ZrO_2$ gives acidity to the catalyst. Zr can be in the form of a mixture jointly with said support medium components, or it has been added afterwards e.g. by soaking. Zr oxides may also constitute a main component in the support substance, whereby its amount can be higher than that of said alkaline additives. The adsorbed $NO_x$ desorbs from several alkaline compounds as early as in lean conditions, in particulate filter regeneration, or at the latest in conditions wherein the λ-value is less than 1.2. The desorbing $NO_x$ can be reduced in a subsequent SCR-catalyst. The adsorbed $NO_x$/HNCO can react also directly or by way of a short surface migration when the H- and SCR-catalysts are integrated into one and the same catalyst.

The hydrolysis-promoting catalyst coatings have been added to mixer structures, which are preferably capable of 3D mixing and which consist for example of crimped foils or meshes, which are alternately wavy in different directions and stacked on top of each other, and which make up a honeycomb type mixer structure. FIG. 2 shows an example of a structure and coatings in two successive channels of unequal sizes, applying the properties of each coating.

Figure 3A:
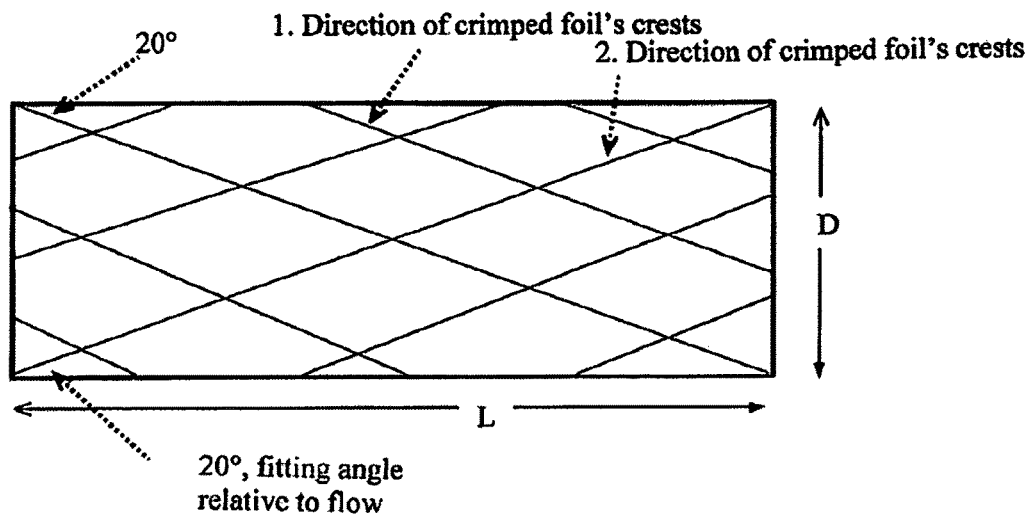
FIG. 3 shows mixer structures made from diagonally crimped foil (A, B and C).
Figure 3B:
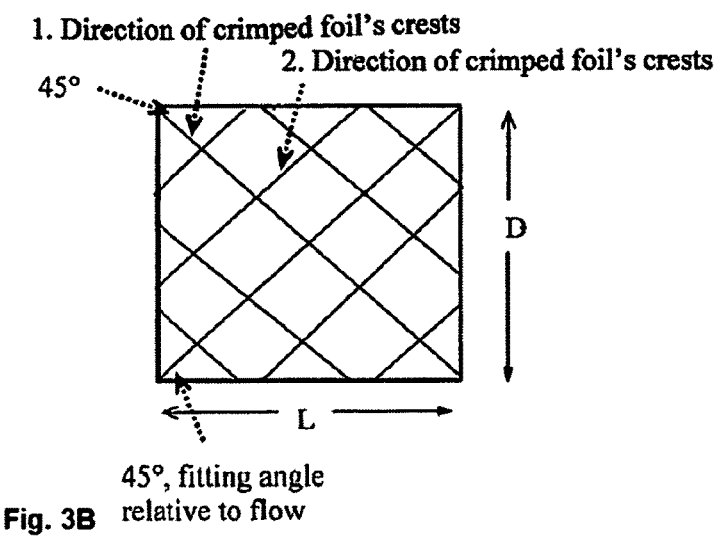
Figure 3C:
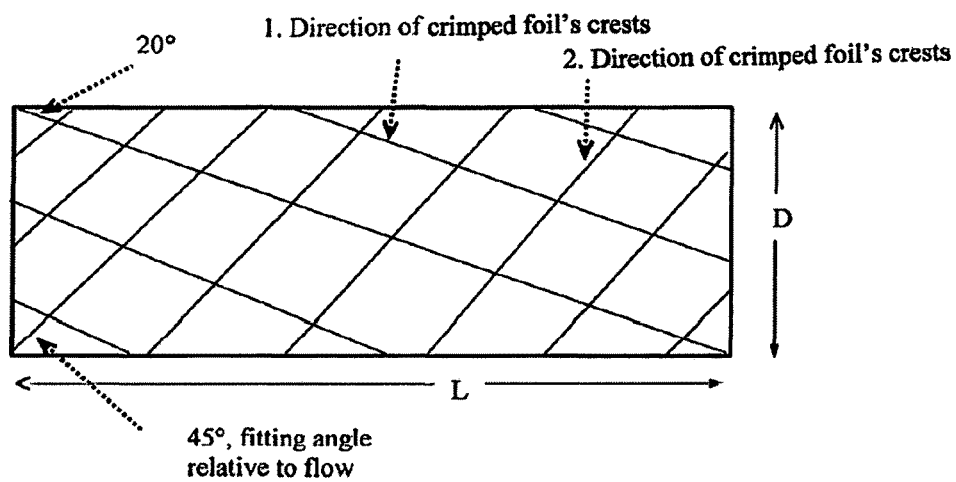

A catalytically coated static mixer unit can be referred to as a static catalyst mixer (SKS). Depending on the foil position, a single mixer element is partly 2D and partly 3D mixing in various directions. When a number of these mixers are installed in succession at 90-degree angles to each other, the achieved result is complete 3D mixing (FIG. 3). The flow that has arrived at a specific spot of the cell's internal face surface may emerge anywhere from the external pipe face. In case the walls are made of meshes, there is also present some flow through the walls, the rate of which depends on the characteristics of the mesh and flow. This is in total contrast with mixer structures that only have mixing inside cell channels, whereby the $NH_3$, urea, or HNCO arriving unevenly in the cell is not able to pass from channel to channel. The SCR-catalyst should have in each channel precisely the same $NH_3/NO_x$ ratio, which enables utilization of the entire catalyst volume and preclusion of $NH_3$ emissions. For this reason, the H-catalyst must equalize the flow and temperature distribution as evenly as possible. If, for example, $NH_3$ becomes channeled onto cold edges, there can be an $NH_3/NO_x$ ratio of more than one, resulting in $NH_3$ emissions. Typically, temperature alongside a pipe wall is considerably lower than in the middle of an empty pipe, which difference can be reduced by using a static mixer structure.

The mixer structure can be made primarily from metal foil, but also from fiber, mesh or a ceramic structure, which are topped by coatings of the invention. A metallic structure makes it easier than ceramic materials to construct a mixing channel pattern. The first and second foils may constitute a single structure or can be laid alternately on top of each other. A metallic structure can be assembled mechanically by welding or soldering at contact points. Through, in front of, or behind the cell can be installed support members.

The channel sizes of mixing elements are in a sparse cell made by using the profile of a crimped foil, wherein the crimp has a height of more than 2 mm and a width of more than 3 mm (≤100 cpsi). In a dense cell, respectively, the mixer profile has been obtained with a crimp height of less than 2 mm and a width of less than 3 mm (>100 cpsi). The fitting angle of a crimped foil relative to the direction of flow must be such that sufficient mixing is achieved, but the back pressure (flow resistance) does not increase too much. Therefore, the generally employed angle for a diagonally crimped cell structure is about 20-30° C., but the angle may also be smaller or larger. A larger angle enables the use of a respectively shorter cell, whereby the back pressures per mixing efficiency remain reasonably similar to those in a longer cell with a smaller angle. In a sparser cell, the Re number (Re=Reynolds) and hence the turbulence are higher, which promotes mixing radially across the entire face surface of a pipe. A correlation, which is designed as desired, can be provided between a fitting angle (β) as well as a length (L) and a diameter (D) of the cell. Generally, the diameter has been determined on the basis of other aspects, so the length of a cell depends on a desired mixing efficiency and pressure drop.

The cell can have such a dimensional design that a crimp crest originating from one edge manages to reach the opposite edge of a channel, i.e. a displacement (s) of the crimp's crest is exactly equal to the pipe's diameter in radial direction (s=D). This would indicate that, with an angle of e.g. 20° in a 100 mm pipe, the mixer unit would be about 274 mm in length. Respectively, with an angle of 45°, the mixer length fulfilling this criterion would be 100 mm (FIG. 3 shows 20 and 45° mixer structures drawn in keeping with this criterion). This could be referred to as an ideal mixer L/D in the defined structure. Respectively, the L/D can also be shorter than this threshold value, but several mixers in succession enables adequately complete mixing to be obtained. A 3D mixer assembly can be established for example by fitting three cells in succession in a hydrolysis reactor. The assembly can be present in a straight pipe or in a cone. The first one is a sparse mixer structure (7, crimping consistent with ≤100 cpsi), the second one is a dense mixer structure (8, crimping consistent with >100 cpsi, horizontal mixing), and the third one is also a dense mixer structure (8, crimping consistent with >100 cpsi, vertical mixing at 90° angle with respect to the second cell).

Accordingly, the hydrolysis catalyst of a urea-SCR system enables the use of a structure, in which the forward segment must be sparse to prevent the drops from hitting too intensely against the face surface and walls of an excessively dense mesh screen, thus causing undesired reactions. The urea drops must first be allowed to mingle, vaporize and become thermally hydrolyzed, which is best promoted with a sparse cell. Should the first cell be dense, it would be necessary to provide a longer distance from the injection point to the cell's forward edge than in the case of a sparse cell. The sparse foremost cell also provides possibilities for thermal hydrolysis to continue without too much disturbance from surface contacts. In a sparse cell, the Re number representing turbulence strength in a channel can be kept sufficiently high. This enables a shortening of total volume required inside a pipe system from injection point to SCR-catalyst. In a sparse cell (10-100 cpsi), the flow is turbulent or less laminar allowing for real mixing to occur in the channel, which is an objective from the standpoint of thermal hydrolysis. In a dense cell (>100-200 cpsi), the mixing is weaker, but there is more catalytic contact surface and, from the standpoint of mass transfer, the distance to a wall is shorter, which partially compensates for the effect (mixing) of a weaker mass transfer coefficient. It is adequate for mixing to have a sparse cell and a short foremost section of the cell. In case of wishing to promote the hydrolysis of mixed and vaporized urea catalytically, it is beneficial to provide more catalyst surface in the rearward section. This is why the rearward section has a higher aperture number. Usually, however, the hydrolysis catalyst features a thin support substance layer, because reactions may proceed in an undesirable direction in case the dwell time in pores is too long. Ammonia may e.g. decompose into nitrogen, which reaction is a problem with ammonia in porous catalysts which have a poor selectivity into ammonia. The coating thickness is in an H-catalyst e.g. as little as 1-20 μm, while the ordinary thickness in coated catalysts is about 20-100 μm. The forward and rearward sections can be equal or unequal in length. Both can be present in a pipe or in an inlet/outlet cone, or one section can be in a cone and the other in a straight pipe.

The flow distribution through various cells is determined according to a pressure drop profile. Pressure drop is generated in such catalyst and honeycomb systems jointly by pipe and local resistances of the cell itself and the flow channels. The local pressure varies in different parts of a channel system. If the channel system is symmetrical with respect to parallel cells, the flow distribution can be judged solely on the basis of a pressure drop in the cells. If the flow channels are not symmetrical and the H-catalyst is provided with a bypass, the calculations will be more complicated as the resistance of a cell and that of a flow channel system must be calculated simultaneously. The resistances of cells are readily assessable with 1D models, but the optimization of a channel system configuration requires that flow profiles be regarded at micro level with a 2D/3D model (CFD).

FIG. 4 illustrates a parallel system with a smaller volume of hydrolysis catalyst and a larger volume of oxidation catalyst. The objective is to establish an appropriate flow distribution through the cells for the reason that even a smaller amount of gas is enough for hydrolysis and the dispersion of urea. As opposed to that, it is important for the oxidation catalyst to have enough volume for generating $NO_2$ in a sufficient amount. It is beneficial that the hydrolysis and oxidation catalysts are in a parallel relationship, because the $NO_2$ generated in the oxidation catalyst may overpromote oxidation reactions in the hydrolysis catalyst, whereby urea is more susceptible to reacting into $NO_x$ or nitrogen. The pressure drop would also increase to a considerable level in systems installed in series with all of the exhaust gas flowing through both sections. In a series system, the volume/diameter of an H-cat would have to be sufficiently large for allowing all of the exhaust gas to flow therethrough without increasing Δp too much. The extra pressure drop resulting from the H-catalyst can be minimized in a parallel system with the combination of an H-catalyst and an oxidation catalyst. The pressure drop through a parallel system can be maintained approximately equal to that of the oxidation catalyst alone, whereby the incorporation of an H-catalyst in the system is sensible from the standpoint of total flow resistance.

The pressure in joint inlet ($p_{in}$) and outlet ($p_{out}$) spaces is approximately similar compared to a cell and a bypass. If the pressure drop and flow distribution are judged in the system of FIG. 4, it is necessary to consider the flow resistance caused by a urea injection cone, as well as that of the bypass channel. The benefits offered by this system of FIG. 4 are almost identical to those of a system that has a sparse 3D-SKS cell upstream and a dense 3D-SKS cell downstream. The same cell size enables to establish a maximized total surface area (TSA) and an optimized flow distribution, which would not be possible with a constant cell density.

Since the forward section of an H-cat must be primarily sparse (50-100 cpsi), it will be difficult to adjust a sufficiently small amount of gas through a standard size H-cat. From the standpoint of normal injection spray diffusion, however, the diameter of an H-cat must be at least about 100 mm. On the other hand, the aperture number of an oxidation catalyst should be sufficiently high (dense cell) for providing it with a sufficient amount of support medium for a kinetically limited $NO_2$ generation reaction that requires a reasonably high Pt-loading, especially when the catalyst volume is small. In a structure of the invention (particularly in a parallel structure), the aperture number of an H-catalyst is typically less than 200 cpsi and that of an oxidation catalyst is 200 cpsi or higher. When the employed oxidation catalyst is a dense cell, the pressure drop is in any case higher than that of the mixer structure. Therefore, the oxidation catalyst diameter should increase to an unacceptably high value in order to obtain a desired flow distribution Oxidation catalyst/H-catalyst: ~80%/20%. Commonly, the maximum diameters of catalysts are dictated by space restrictions.

In the foremost sparse SKS there has been used a very thin (0.1-10 µm), low surface area (<10 $m^2$/g) coating, whereby adhesion and cohesion can be built up to become good and the coating density to become low. In earlier, prior known systems, it has been particularly emphasized that the specific surface area of a coating is over 10 $m^2$/g. When the surface area is not excessive, urea is not allowed into the pores to react in the first cell, resulting in delay or harmful by-products (e.g. polymerization). The 1st cell may also be totally uncoated or the surface is only provided with the mixer structure's own material as a coarser layer, e.g. as an oxide. Despite possibly being so thin, the coating provides a remarkable addition to the surface area compared to a bare cell. If the cell of 100 cpsi has 1.7 $m^2$ of surface/L of cell, the surface area can be increased with a thin coating (amount of coating 5 g/$m^2$ (<10 µm), BET: 5 $m^2$/g of coating) significantly, i.e. to the level of 42 $m^2$ of surface/L of cell or approximately 25-fold. This is a way of ensuring the layer strength as urea drops strike the 1st layer, and the total contact area increases significantly. A thin layer is also used for ensuring that the dwell time due to adsorption shall not become too long in a cell with large surface area, which would complicate the system control in transient conditions, particularly at low temperatures with adsorption capacities high e.g. in $TiO_2$-based H-catalysts. The 1st cell is typically provided with low surface area materials, such as $TiO_2$ in rutile form. In addition, there is a presence of compounds, which upon calcination produce other low surface area compounds, such as compounds of La, Zr or porous metals or ceramics.

In downstream SKS-mixers, the coating is thicker (>5 µm) and the coating has a higher surface area (>10 $m^2$/g), whereby its catalytic properties assist kinetically restricted reactions. In the second SKS, the cell surface can be provided with a thin, low surface area coating similar to the one used in the first cell, and that can be topped with another thicker H-catalyst coating, which has a higher surface area and a catalytic activity in hydrolysis. What has been used in the active H-catalyst coating is e.g. anatase form $TiO_2$ or zeolite jointly with binders and active and alkaline components, having a surface area in the coating of more than 10 $m^2$/g, usually more than 50 $m^2$/g. In the downstream layer may also be present some SCR-catalyst, whereby the evolving $NH_3$ is able to immediately carry on the reaction as early as upstream of the actual SCRreactor. This SCR-catalyst can be $TiO_2$-, zeolite- or alumina-based. The coating may have a content of e.g. V, W, Mo, Zr, La, Sn, B, Mn, Cu, Co, Fe, Ce and/or Si in a $TiO_2$ support medium or Fe, Ce and/or Cu in a zeolite support medium. The employed zeolite can be ZSM-5, Beta, ferrierite, TS-1 or mordenite or mixtures thereof or corresponding metal and aluminum silicates. Other high surface area support media include e.g. aluminum oxides and aluminum phosphates (SAPO). The SCR coating can be on the surface or in a bottom layer. Alkaline components may also be in addition to an H-catalyst or exclusively in the SCR-catalyst layer. It is possible that the properties and compositions of H- and SCR-catalysts be integrated in one the same coating layer. The presence of an SCR coating in the bottom layer allows for avoiding the contact of urea particles/drops with the SCR-layer, thus reducing possible side reactions. Hence, the urea drops are able to make contact with the H-catalyst coating, but the migration of drops into the bottom layer prior to vaporization is denied by pore diffusion barriers. This feature can be necessary when operating at very low temperatures, wherein the system desired most assistance from the H-catalyst and the vaporization of urea or some other reducing agent is at its slowest with some drops possible making it all the way to the 2nd cell.

The presence in a second cell of a catalyst promoting high temperature SCR makes it thereby possible to increase total SCR activity and to enable the H-catalyst to employ an SCR-catalyst designed specifically for high temperature (e.g. Fe-zeolite catalyst), which differs from the composition of an actual SCR-catalyst (e.g. V—W/$TiO_2$—($SiO_2$) or Cu-zeolite catalyst). An H-catalyst is beneficial at low temperatures, but having an H-catalyst supplemented with an SCR-catalyst composition allows to obviate the negative consequences of high temperature, such as the decomposition or oxidation of $NH_3$.

In a system of the invention, the first and second units can be used in such a way that one is provided with an acidic and the other with an alkaline or less acidic coating. Acidity correlates, among other things, with the adsorption strengths of $NH_3$ and HNCO in H-catalysts. It is desirable to have HNCO react quickly into $NH_3$, but $NH_3$ must not decompose, which is why this composition can be established. Alkaline $NH_3$ adsorbs vigorously on acidic surfaces, which may promote a catalyst reaction or cause inhibition at low temperatures. As for superimposed layers, one can be provided with an acidic and the other with an alkaline and less acidic coating. Acidity at a specific temperature can be assessed e.g. with $NH_3$ or pyridine adsorption measurements. Acidities have been regulated i.a. with sulfate amounts, said sulfate having possibly been stabilized with Zr, Sn or other corresponding sulfate-forming compounds (e.g. sulfated Zr-oxide/hydroxide). Alkalinity has been increased i.a. with La, Ca, Ba, Sr and/or Y. In the second cell, it is possible to increase, as described above, especially in the SCR-catalyst layer, the high-temperature $NH_3$ adsorption capacity, whereby the urea-generated $NH_3$ reacts with $NO_x$ rather than with oxygen. Thus, it is an objective to increase the high temperature acidity in the SCR layer of this structure, whereby the actual SCR-catalyst (a separate reactor) can be optimized in a regular manner regarding its composition and dimensional design for the temperature range of 200-500° C., which is the most typical working range e.g. for V—W/$TiO_2$-based SCR-catalysts.

If there is an oxidation catalyst upstream of the H-catalyst, the hydrolysis and SCR reactions can be promoted particularly at low temperatures (the effect of $NO_2$). The oxidation catalyst can also be one that forms little $NO_2$, whereby the fluid arriving at the H-catalyst has been mostly relieved of hydrocarbons, carbon monoxide and some of the particles.

In this case, the oxidation catalyst's active metal is e.g. PtPd or Pd, the formation of $NO_2$ with Pd being very slight as compared to Pt. This favors the H-catalyst to keep clean with less residues being collected from hydrocarbons in the H-catalyst.

The system according to the invention enables a reduction in the amount of undesired by-products (HNCO) discharging from an exhaust pipe. This is critical especially at low temperatures due to slow reaction rates, and possibly at high temperatures due to selectivity.

Some catalyst compositions according to the invention have been coated by dipping or immersing a completed, generally honeycomb type metallic or ceramic catalyst structure in a catalyst slurry. Alternatively, a crimped, open cell structure is coated by spraying and by wrapping or folding after the coating process for a finished cell. The alkalinity-promoting additives can also be post-impregnated in a catalyst e.g. from aqueous solutions, dried and calcined.

The catalyst coating according to the invention can be pre- or post-coated on regular ceramic or metallic cells or structures, wherein the aperture shape (e.g. square, triangle), the aperture density (a diagonally crimped structure corresponding to 10-2000 cpsi, apertures/square inch or am equivalent crimping height) or the wall thickness (10-500 μm) may fluctuate over a wide range, depending on intended use, material and requirements.

The coatable cells make up a sort of static mixer structure, which either has separate channels provided with mixing zones (e.g. bends, flow barriers or constrictions) or the structure is established by installing crimped, wavy foils, sheets and/or mesh screens on top of each other in such a way that the direction of a wave crest deviates from the incoming direction of gas and the wave crests of superimposed sheets are divergent (FIG. 3). In a conventional metal cell, the wave crests of a crimped foil are co-directional with each other and with the main flow direction. The mixing efficiency can be regulated by varying the angle between the wave crest and the main flow direction. The diagonally crimped foil/mesh pair has its wave crests provided with dot-like contact points, which can be utilized in mechanical reinforcement (welding, soldering). The mixer structure provides for turbulence of flow in a radial direction of the pipe. The mixer structure also provides for degrees of separation for particles higher than those of a conventional mixer structure. The coatable structure may also consist partially or entirely of a metal mesh screen, a sintered porous metal, or a particle trap.

The described hydrolysis catalyst coatings can also be applied to a particulate filter, which is in front of an SCR-catalyst and the introduction of urea occurs upstream of the particulate filter. The H-catalyst coating is thermally more durable than most SCR-catalysts in particulate filter conditions, nor can the amount of catalyst be low anyway from the standpoint of hydrolysis, whereby the coating does significantly increase the back pressure. The particulate filter provides also a major volume and dwell time for enhanced hydrolysis. Particularly appropriate for this solution is also the presence of an SCR coating, the longer dwell time not resulting in too much decomposition or oxidation of $NH_3$. Possible precipitates and urea are accumulated in the filter instead of discharging from the exhaust pipe, and are decomposed into ammonia as temperature rises. A particulate filter monitoring system (OBD based on pressure sensors) also senses the accumulation of urea, whereby the monitoring of hydrolysis is achieved without any accessories by an OBD-method integrated with particulate filter monitoring. The filter can be a honeycomb type full-flow or partial-flow filter which is not easily blocked, either. Since the system in any event includes a filter unit and an SCR unit in this order, the temperature in warming-up stages will in any case be higher in front of the filter than in front of the SCR-catalyst, which is beneficial for the SCR reaction.

The parallel combination oxidation catalyst+H-catalyst is also functional as a system, which is intended for reducing particles and which enables the amount of particles to be decreased e.g. by 20-60%. In that case, it is possible that the system does not require a separate particulate filter for reaching the future emission standards.

The temperature of an H-catalyst unit can be warmed up in operating conditions e.g. electrically or by feeding fuel into an exhaust manifold. In this case, the H-catalyst is preceded by an oxidation catalyst, which promotes the combustion of fuel at low temperatures. The temperature rise can also be conducted by an A/F-adjustment of the engine (A/F=air/fuel) in combination with post-injection into the engine or exhaust manifold. Extra heating enables the H-catalyst to function at critical low temperatures (150-250° C.). Heating may also be applied to the SCR-catalyst. The strategy of extra heating is combined with the parameters of an engine or urea injection map.

The hydrolysis catalyst can also be used for the removal of $NO_x$ based on thermal, non-catalytic SCR. In this case, the ammonia derivative (e.g. urea) is mixed and hydrolyzed in a catalyst of the invention before passing it to non-catalytic reduction. This serves to accelerate the hydrolysis of urea. The hydrolysis unit can also be supplied with thermal SCR-promoting additives, such as hydrogen, hydrocarbons, CO or derivatives thereof. The hydrolysis catalyst can also be used in gasification gases, which comprise not only $NH_3$ but also HNCO. The treated gas is passed into an $NH_3$ removal catalyst, to incineration or to some other power/fuel production unit. Temperatures in these operations are often within the range of 600-900° C., temperatures to which compositions of the invention are comfortably resistant. Pressure in these operations is also often at an elevated level (1-30 bar), which is advantageous in terms of dimensional design (longer dwell times in pressurized condition, thus allowing the use of respectively smaller catalyst volumes, e.g. 20 bar→reactor volume 1/20 fraction of a normal pressure operation).

The hydrolysis catalyst can also be used in liquid-solid or liquid-gas-solid reactions, which involve reducing e.g. nitrates in liquids (solid=catalyst, liquid=water, gas=e.g. ammonia or hydrogen).

The invention can also be used in undertakings, wherein the reducing agent is directly ammonia. The described catalyst adsorbs ammonia very little, but is effective in adsorbing $NO_x$, which can be utilized in a unit (mixing unit) upstream of the SCR reactor or integrated with the SCR unit.

The catalysts according to the invention were manufactured for laboratory tests by first preparing slurry from powdered and solution type raw materials, as well as from water. The resulting slurry was mixed and ground in a ball mill. The properties (quality, purity, particle size, possible stabilizers) of raw materials were altered in tests for providing desired coating properties. The catalysts were applied to the surface of a metal foil 50 μm in thickness, the samples were dried at about 110° C. and calcined for the period of 4 h at 550° C. When calcined in static air, most compounds formed respective oxides.

EXAMPLE 1

Hydrolysis catalysts (H-catalysts) were tested in laboratory conditions by using a gas mixture, which contained 1000 ppm NO, 10% oxygen, 8% water and the rest nitrogen, as well as 500 ppm urea (resulting theoretically in 1000 ppm $NH_3$), as an aqueous solution that had been injected within an exhaust gas, measuring within the range of 150-450° C. the objective was to obtain downstream of the hydrolysis catalyst as much $NH_3$ as possible, a minimum amount of HNCO without the oxidation of $NH_3$ into nitrogen or oxides of nitrogen. Reaction products ($NH_3$, HNCO, NO, $NO_2$) were measured with FTIR, and the sampling line was trace-heated. Exchange over the H-catalyst was 100.000 $h^{-1}$ and over the SCR-catalyst 50.000 $h^{-1}$.

The test catalysts were coated on the surface of a metal cell structure (test series 1-table 1). The essential aspect in laboratory scale was studying the impact of composition, since the significance of mass and heat transfer becomes more evident in full-scale tests. The aperture number was about 500-600 cpsi (cells per $in^2$) and the foil thickness was 50 μm. The employed raw materials included anatase $TiO_2$ having a large surface area and comprising less than 0.6 wt % sulfate, or catalyst No. 6 had 2 wt % sulfate in its surface layer. Sulfated zirconium hydroxide was also used as a raw material. La was added as La-nitrate, or in No. 7 it was impregnated and calcined beforehand in $TiO_2$. Si-sol was used as a binder in the samples and mounted to 10-16% as $SiO_2$ in the final catalysts. Drying was effected by drying in warm air the samples were finally calcined at 550° C. for 4 hours. The catalysts had a surface area of about 60-100 $m^2/g$.

TABLE 1

Catalysts in tests-test series 1

| No | Coating g/$m^2$ | Composition |
|---|---|---|
| 1 | 33 | $TiO_2$ + 16% $SiO_2$-Reference |
| 2 | 20 | $TiO_2$ + 4.5% Zr(OH)$SO_4$-16% $SiO_2$ |
| 3 | 22 | $TiO_2$ + 10% $La_2O_3$-16% $SiO_2$ |
| 4 | 22 | 2.8% Zr/$TiO_2$ + 10% $La_2O_3$-16% $SiO_2$ |
| 5 | 21 | $TiO_2$-18% $La_2O_3$-4% Zr(OH)$SO_4$-10% Si |
| 6 | 30 + 11 | Bottom: $TiO_2$-8% $WO_3$-2.4% $V_2O_5$-16% $SiO_2$ Top: 2.8% Zr/$TiO_2$-2% $SO_4$-10% $La_2O_3$-16% $SiO_2$ |
| 7 | 20 | $TiO_2$-10% $La_2O_3$-16% $SiO_2$ |
| 8 | 40 | $TiO_2$-13% $WO_3$-2.4% $V_2O_5$-16% $SiO_2$-SCR-catalyst | cpsi: cells per square inch

Tests included monitoring the formation of HNCO (to be minimized) the formation of $NH_3$ (to be maximized after H-catalyst, to be minimized after SCR-catalyst), and the $NO_x$ conversion (no negative conversion in H-catalyst and to be maximized after SCR-catalyst). In tests, the distance of H- and SCR-catalysts from each other was short for simulating difficult conditions.

HNCO concentrations were very high as urea was introduced into an empty reactor (blanco), and the dwell time in a hot reactor was in these conditions reasonably short. As a result of using an H-catalyst in the reactor, the HCO concentrations decreased distinctively. With a prior known $TiO_2$-$SiO_2$-catalyst, HNCO was low at low temperatures, but with catalysts of the invention, HNCO was distinctly lower at over 300° C. (FIG. 5). At less than 250° C., the catalysts of the invention generated more $NH_3$ than the reference (FIG. 6). The catalysts of the invention had a low oxidation activity of $NH_3$ into $NO_x$ (FIG. 7). With a 2-layer catalyst (No. 6), the HNCO formation was nearly nonexistent (FIG. 8). This catalyst had an SCR-active bottom layer and a top layer of the invention, leading to this result. What is achieved by this structure is that the possible undecomposed urea comes at the surface first across an H-catalyst composition of the invention, and thereafter the $NH_3$ presently in gas phase and the $NO_x$s migrate in the catalyst's pores into the bottom layer's SCR-catalyst, in which some of the nitrogen oxides are also reduced.

The combination H-catalyst+SCR-catalyst was used in an effort to simulate the final SCR system. The use of an H-catalyst in front of an SCR-catalyst enabled a total elimination of the HNCO-formation (FIGS. 9 and 10) with no HNCO emissions generated in the exhaust gas. The $NO_x$ conversion did not show major differences, but the low temperature activity was positively influenced by H-catalysts of the invention. These results provided a basis for designing catalysts for test series 2 in view of optimizing the composition.

EXAMPLE 2

A second series (metal foil 50 μm, aperture number 600 cpsi, amount of coating 20 g/$m^2$) has employed a variety of additives in the H-catalyst in an effort to promote hydrolysis (table 2). The employed additives have included, i.a. Ba, Sr, Y, La, Pr, Zr, Ga, K and combinations of these additives (concentrations in wt % in table 2). The additives had been impregnated from the nitrate solution of a starting material into a support medium, the latter comprising $TiO_2$ and $SiO_2$ (in weight ratio 5:1). After impregnation, the catalysts were calcined at 550° C. for 2 hours. The employed reference was a catalyst which contained just $TiO_2$ and $SiO_2$ without additives. Tests were conducted as in example 1. The aged samples were treated hydrothermally (10% water in air 600° C./20 h) and sulfurized for 20 hours at 400° C. in a mixture comprising 25 ppm $SO_2$, 10% oxygen and 8% water. Used in the combination of H- and SCR-catalysts was ceramic tungsten-titania-based vanadium-SCR-catalyst (V—W/$TiO_2$), in which the aperture number was 300 cpsi (cordierite, wall about 125 μm) and the amount of coating about 40 g/$m^2$.

Examination was first conducted on $NH_3$ and HNCO developing in an H-catalyst without a downstream SCR-catalyst. What was discovered in this measurement was the influence of an H-catalyst regarding the selectivity of urea into ammonia, HNCO, and the oxidation into $NO_x$. The analysis of results was focused on temperature ranges where the presence of an H-catalyst was most significant: at low temperatures within the range of 205-350° C. to be obtained max. $NH_3$ and a minimum amount of HNCO, as well as at a high temperature (450° C.) as little as possible the oxidation of urea and ammonia into $NO_x$. Temperature has been measured upstream of the H-catalyst. With all catalysts of the invention, the $NH_3$ yield was higher than in an empty reactor and, compared to the reference catalyst, with all catalysts other than those comprising Sr, Pr and Ga, the $NH_3$ yield was higher. The HNCO formation was highest in an empty reactor, and compared to the $TiO_2$-$SiO_2$ reference, approximately the same level was achieved except with additives Ca, Pr, La—Ba and La—Sr. The oxidation of $NH_3$ at 450° C. was in test conditions at approximately the same level as with the references, i.e. none of these compositions increased the oxidation activity of $NH_3$. A particularly low oxidation activity was reached with La—Ba additives. The basic reference was blanco, i.e. an empty reactor. It was the objective that good properties be achieved at low temperatures, but that the same additives not have an excessively high oxidation activity at higher temperatures.

The same H-catalysts were also used in conducting $NH_3$- and $NO_x$-adsorption capacity tests at 200° C. (table 2). Temperature has been selected from within a range most critical in hydrolysis. It is noted that alkaline additives increase clearly the adsorption of $NO_x$ and decrease the adsorption of $NH_3$, with the exception of Zr and Ga which resulted in an increase of the $NH_3$-adsorption. Zr served an alkaline purpose jointly with La. In a two-component system, the role of Zr could be to stabilize the catalyst thermally and chemically. The singularly highest $NO_x$-adsorption was achieved with La and Y. The lowest $NH_3$-adsorption was with bicomponent systems La+Pr (5% of reference capacity), followed by La+Ba and La+Sr (16% of reference capacity). The way Pr works is slightly different from compounds selected from other groups of the periodic table, i.a. according to $NO_x$-adsorption and $NH_3$-adsorption measurements. Pr functioned well also with La. In addition to Pr, it is possible to use also other rare earth metals such as Ce, Nd, Sm, Eu and/or Gd. Instead of or in addition to La, Y and Zr, it is also possible to use hafnium (Hf), the influence of which is supposedly similar to that of La, Y and Zr. These additives have a promoting influence even when the SCR feature has been included as an integrated part of the coating. These adsorption measurements provide a direct measurement result of the described properties of the invention, which lead to the benefits discovered in the tests.

TABLE 2

Average HNCO- and $NH_3$-formation from urea at low temperatures and oxidation of $NH_3$ at a high temperature in a test with a fresh H-catalyst alone-test series 2.

| No | Composition | $NH_3$, ppm 205-350° C. | HNCO, ppm 205-350° C. | $NO_x$ ads µmol/g | $NH_3$ ads µmol/g |
|---|---|---|---|---|---|
| 1 | $TiO_2$-16% $SiO_2$-5% Ba | 798 | 5 | 93 | 46 |
| 2 | $TiO_2$-16% $SiO_2$-5% Sr | 727 | 5 | 63 | 48 |
| 3 | $TiO_2$-16% $SiO_2$-10% Y | 808 | 8 | 112 | 71 |
| 4 | $TiO_2$-16% $SiO_2$-10% La | 733 | 4 | 117 | 51 |
| 5 | $TiO_2$-16% $SiO_2$-5% Ca | 799 | 15 | 65 | 92 |
| 6 | $TiO_2$-16% $SiO_2$-5% K | 749 | 6 | 43 | 30 |
| 7 | $TiO_2$-16% $SiO_2$-5% Zr | 810 | 3 | 23 | 141 |
| 8 | $TiO_2$-16% $SiO_2$-5% Pr | 738 | 10 | 49 | 90 |
| 9 | $TiO_2$-16% $SiO_2$-5% Ga | 713 | 6 | 26 | 130 |
| 10 | $TiO_2$-16% $SiO_2$-10% La-5% Ba | 856 | 14 | 115 | 19 |
| 11 | $TiO_2$-16% $SiO_2$-10% La-5% Sr | 836 | 16 | 43 | 19 |
| 12 | $TiO_2$-16% $SiO_2$-10% La-5% Pr | 836 | 3 | 107 | 6 |
| 13 | $TiO_2$-16% $SiO_2$-10% La-5% Zr | 807 | 5 | 94 | 58 |
| 14 | $TiO_2$-16% $SiO_2$-10% La-5% Ga | 798 | 5 | 43 | 43 |
| 15 | $TiO_2$-16% $SiO_2$ Reference | 741 | 5 | 27 | 118 |
| 16 | Blanco-Reference | 309 | 58 | — | — |

$NH_3$ ads: $NH_3$-adsorption in step response experiment $N_2 \rightarrow$ 500 ppm $NH_3$ in nitrogen and 10% in oxygen, temperature 200° C. Calculated from step response experiment is the adsorbed $NH_3$ amount per coating unit.
$NO_x$ ads: $NO_x$-adsorption in step response experiment $N_2 \rightarrow$ 300 ppm NO + 200 ppm $NO_2$ in nitrogen ja 10% in oxygen, temperature 200° C. Calculated from step response experiment is the adsorbed $NO_x$ amount per coating unit.

The $NO_x$ conversion was assessed with mixtures having an aged content of 1000 ppm of NO and 600 ppm of NO+400 ppm of $NO_2$ (urea 500 ppm, which theoretically results in 1000 ppm of $NH_3$, $NH_3/NO_x$=1). The $NO_2$-comprising mixture simulates the system oxidation catalyst (DOC=diesel oxidation catalyst)+H-catalyst+SCR-catalyst. The SCR reaction in SCR-catalyst is promoted by $NO_2$, especially at low temperatures, but in this experiment there is still an intermediate H-catalyst, resulting in a system different from DOC+SCR. $NO_2$ may have an impact on the reactions of urea, ammonia and HNCO in H-catalyst. Therefore, the examination of results is mainly focused on low temperatures.

Regarding all catalysts of the invention, the $NO_x$ conversion with the combination SCR+H-catalyst was higher at 205-260° C. than with an NO-mixture without the H-catalyst (table 4). A majority of the samples also promoted the $NO_x$ conversion more than the $TiO_2$-16% $SiO_2$ catalyst used as reference. With the presence of a SCR-catalyst, the HNCO concentrations with all catalysts were less than 10 ppm, except for a test without an H-catalyst in which the HNCO was 15 ppm. Hence, the discharge of HCO is effectively eliminated by an SCR-catalyst, but it is possible between the urea injection point and the SCR-catalyst that the higher HNCO concentration in gas phase and on surfaces proves harmful. It should be noted that the results of table 4 have been obtained with a hydrothermally aged and sulfated (20 h, 10% water, and 25 ppm $SO_2$ in air) sample, whereby the sulfation of alkaline additives did not destroy the good qualities. These adsorption sites can thus be also filled with sulfates ($SO_x$) or nitrates ($NO_x$) in operating conditions or even after the preparation (conducted with sulfate raw materials).

TABLE 4

Average $NO_x$ conversions within the range of 205-260° C. aged with the combination H-cat + SCR, when the supply gas has 1000 ppm of NO or 600 ppm of NO + 400 ppm of $NO_2$-test series 2.

| No | Composition | NO Aged | NO + $NO_2$ Aged |
|---|---|---|---|
| 1 | $TiO_2$-16% $SiO_2$-5% Ba | 53 | 74 |
| 2 | $TiO_2$-16% $SiO_2$-5% Sr | 61 | 74 |
| 3 | $TiO_2$-16% $SiO_2$-10% Y | 57 | 69 |
| 4 | $TiO_2$-16% $SiO_2$-10% La | 57 | 80 |
| 5 | $TiO_2$-16% $SiO_2$-5% Ca | 56 | 78 |
| 6 | $TiO_2$-16% $SiO_2$-5% K | 54 | 74 |
| 7 | $TiO_2$-16% $SiO_2$-5% Zr | 60 | 74 |
| 8 | $TiO_2$-16% $SiO_2$-5% Pr | 59 | 77 |
| 9 | $TiO_2$-16% $SiO_2$-5% Ga | 58 | 71 |
| 10 | $TiO_2$-16% $SiO_2$-10% La-5% Ba | 52 | 68 |
| 11 | $TiO_2$-16% $SiO_2$-10% La-5% Sr | 57 | 60 |
| 12 | $TiO_2$-16% $SiO_2$-10% La-5% Pr | 53 | 61 |
| 13 | $TiO_2$-16% $SiO_2$-10% La-5% Zr | 51 | 74 |
| 14 | $TiO_2$-16% $SiO_2$-10% La-5% Ga | 48 | 66 |
| 15 | $TiO_2$-16% $SiO_2$ REF | 52 | 66 |

EXAMPLE 3

Figure 11:
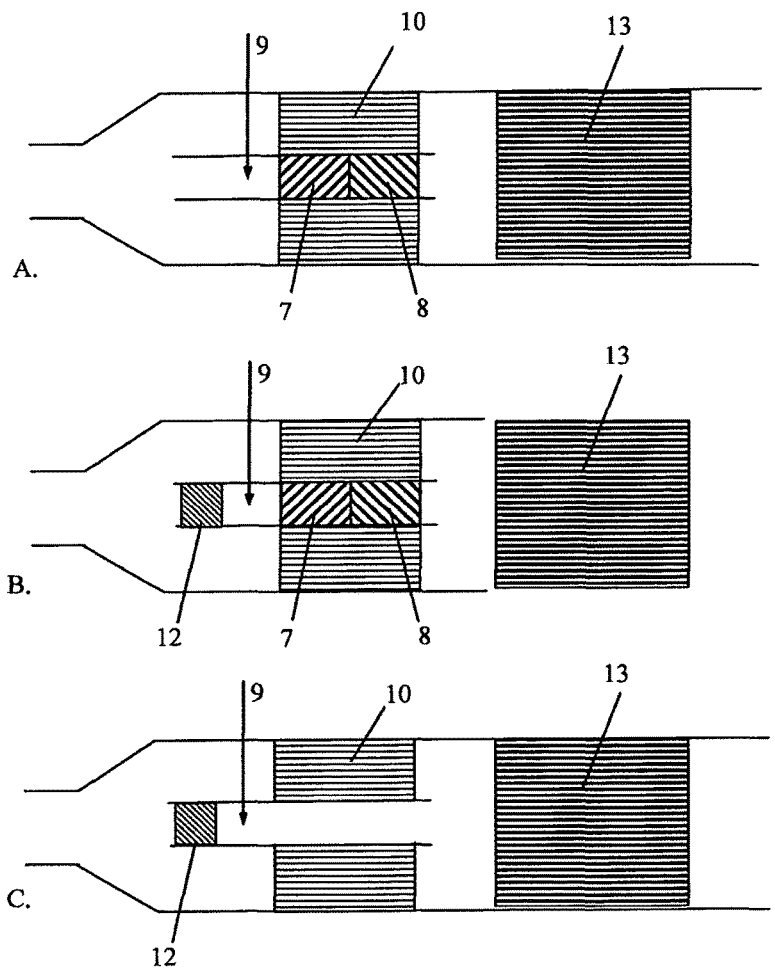
FIG. 11 shows H catalyst and reducer injection in an oxidation catalyst bypass: 7 illustrates sparse mixer structure (crimping equivalent to ≤100 cpsi), 8 illustrates dense mixer structure (crimping equivalent to >100 cpsi), 9 illustrates reducer introduction, urea or the like, 10 illustrates oxidation catalyst, 12 illustrates coated or uncoated cell structure for flow distribution adjustment and for oxidation, and 13 illustrates SCR.

This example comprises simulation of an appropriate flow distribution through parallel and successive catalyst cells. The distribution of flow through parallel cells is influenced by pressure drops in the cell and in flow channels. In the event that the flow channels (inlet and outlet cones and pipes) are identical, the pressure drop can be assessed by measuring or mathematically solely on the basis of pressure drops in the cells. What can be calculated is how much gas flows through parallel and successive cells. Based on pressure drop equations modeled from experimental measurements, the benefits and properties of a system according to the invention are presented in the table. The GSA of what in terms of profile is "a 100 cpsi mixer" is 1.67 $m^2$/L and that of a corresponding "400 cpsi mixer" is 3.1 $m^2$/L. This results in a major discrepancy regarding the TSA (total surface area), which in the system of table 6 is 43% higher than in the system of table 5, the H-catalyst in the latter comprising two identical sparse mixers. Using the assembly 100+400 cpsi in an H-catalyst enabled a structure, in which 23% of the flow proceeded through the H-catalyst. However, the total back pressure only rose by 1 mbar across the system's cells (8→9.4 mbar). Applicable variables in the system optimization may include aperture numbers, diameter (increasing the diameter of an oxidation catalyst), cell type (specific flow resistance), as well as H- and oxidation catalysts of unequal lengths (oxidation catalyst is shorter). FIG. 11 shows dissimilar structures for making use of parallel oxidation and hydrolysis catalysts of the invention. This is partially the same as in FIG. 4. It is also possible to provide a bypass pipe with the structure of FIG. 11C, wherein the injection is preceded also by a cell assembly that can be used for regulating the flow distribution. A forward cell (12) can also be coated with an oxidation catalyst, an HC-SCR catalyst or be uncoated. A Pt-comprising oxidation catalyst can be used for generating an appropriate amount of $NO_2$ and for removing hydrocarbons prior to urea injection, which assists e.g. the hydrolysis of urea at low temperatures. This catalyst can also be Pd-comprising or Pd-rich, whereby a high $NO_2$ amount is not generated and hydrolysis may occur without $NO_2$. This may prove beneficial in a high temperature operation (lessening of $NH_3$ oxidation). A precious metal comprising catalyst is also useful, if preceded by a particulate filter which is regenerated actively. Hence, this front catalyst precludes hydrocarbon and particle spikes in the hydrolysis zone.

Another possibility is the use of a structure, wherein alongside the oxidation catalyst is an empty pipe or bypass, thus providing a back pressure, advantage and, possibly, the reducer injection pipe is warmed up by a surrounding gas, whereby the hydrolysis unit does not have cold walls during operation. This is an effective way of excluding thermal gradients, which are generated by cold walls and which are detrimental to hydrolysis (urea). Of course, this same virtue is found in units, which have an H-catalyst inside. All these practices enable the hydrolysis to occur as effectively and selectively as possible.

TABLE 5

Flow distribution in a parallel system, including a 120 cpsi oxidation catalyst and a 100 cpsi H-catalyst (TSA 1.3 m²). 33% of the flow through the H-catalyst. Cell numbering as in FIG. 4, whereby the same flow passes through cells 7 and 8 and a parallel flow through cell 10.

|  | H-CAT | | DOC |
|---|---|---|---|
| Cell No. | 7 | 8 | 10 |
| Cell type | Ecoxcell20 | EcoXell20 | Ecocat |
| Aperture number, cpsi | 50 | 100 | 2.6 |
| Diameter, mm | 100 | 100 | 173 |
| Length, mm | 50 | 50 | 100 |
| Temperature, K | 773.15 | 773.15 | 773.15 |
| Pressure, Pa | 101325 | 101325 | 101325 |
| Mass flow rate, kg/s | 0.0637 | 0.0637 | 0.1308 |
| Flow distribution, % | 32.8% | 32.8% | 67.2% |
| Density, kg/m³ | 0.4566 | 0.4566 | 0.4566 |
| Wall thickness, µm | 80 | 80 | 50 |
| Coating thickness, µm | 32 | 32 | 40 |

TABLE 5-continued

Flow distribution in a parallel system, including a 120 cpsi oxidation catalyst and a 100 cpsi H-catalyst (TSA 1.3 m²). 33% of the flow through the H-catalyst. Cell numbering as in FIG. 4, whereby the same flow passes through cells 7 and 8 and a parallel flow through cell 10.

|  | H-CAT | | DOC |
|---|---|---|---|
| Cell No. | 7 | 8 | 10 |
| Coating amount, g/m² | 19.2 | 19.2 | 24 |
| Back pressure, mbar | 4.00 | 4.00 | 8.01 |

EcoXcell: a metallic honeycomb, comprising crimped cells set alternately at a 20-degree angle relative to each other → mixer structure
Ecocat: a metallic honeycomb, having closed channels but flow barriers and constrictions inside the channels.
H-CAT = H-catalyst and
DOC = oxidation catalyst.

TABLE 6

Flow distribution in a parallel system, having a 120 cpsi oxidation catalyst, as well as the combination 100 + 400 cpsi as an H-catalyst (TSA 1.86 m²). 23% of the flow through the H-catalyst, which is within a desired range.

|  | HCAT | | DOC |
|---|---|---|---|
| Cell No. | 7 | 8 | 10 |
| Cell type | Ecoxcell20 | EcoXell20 | Ecocat |
| Aperture number, cpsi | 100 | 400 | 2.6 |
| Diameter, mm | 100 | 100 | 173 |
| Length, mm | 50 | 50 | 100 |
| Temperature, K | 773.15 | 773.15 | 773.15 |
| Pressure, Pa | 101325 | 101325 | 101325 |
| Mass flow rate, kg/s | 0.0452 | 0.0452 | 0.1492 |
| Flow distribution, % | 23.2% | 23.2% | 76.8% |
| Density, kg/m³ | 0.4566 | 0.4566 | 4.4566 |
| Wall thickness, µm | 80 | 80 | 50 |
| Coating thickness, µm | 32 | 32 | 30 |
| Coating amount, g/m² | 19.2 | 19.2 | 18 |
| Back pressure, mbar | 2.31 | 7.13 | 9.44 |

The invention claimed is:

1. A hydrolysis catalyst (H-catalyst) for hydrolysis of urea to produce ammonia and for adsorbing HNCO and nitrogen oxides, wherein the H-catalyst comprises alkaline compounds, the alkaline compounds being a lanthanum compound and one or more compounds of elements selected from the group consisting of alkali and alkaline earth metals, yttrium, hafnium, praseodymium, gallium and zirconium,
wherein the H-catalyst is in the form of a catalyst coating, the catalyst coating being anatase form titanium dioxide-based, or $SiO_2$-based, or Beta form zeolite-based, or ZSM-5 form zeolite-based, or zirconia-based or mixtures thereof.

2. The H-catalyst according to claim 1, wherein total concentration of the alkaline compounds is within the range of 0.1-80%.

3. The H-catalyst according to claim 1, wherein total concentration of the alkaline compounds is within the range of 0.5-20%.

4. The H-catalyst according to claim 1, wherein the catalyst coating is applied to one or more successive honeycomb type structures enabling effective mixing and reaction of a reducing agent in the catalyst coating.

* * * * *